Patented June 19, 1934

1,963,581

UNITED STATES PATENT OFFICE 1,963,581

SEWAGE TREATMENT

Hovhaness Heukelekian, New Brunswick, N. J., assignor to The Dorr Company, Inc., New York, N. Y., a corporation of Delaware No Drawing. Application March 21, 1932, Serial No. 600,371

2 Claims. (Cl. 210—2)

This invention relates to processes of digesting or decomposing mixed organic substances, such as sewage, or industrial or trade wastes.

The disposal of sewage, and other mixed organic matter or waste containing fats, greases, nitrogenous matter, cellulosic material or carbohydrates presents a serious problem, especially to large communities. In coastal communities or near the seaboard the waste matter can be carried out beyond tide water limits and dumped, but inland communities must treat or dispose of the waste in some other manner. Before such waste can be discharged into streams or water courses, all injurious parts of the solids and bacteria associated therewith must be removed so that the effluent will be innocuous and will not pollute the water.

Referring particularly to sewage disposal, two steps are in common use. One step, known as the aerobic process, consists of subjecting the sewage to the action of bacteria requiring air, as, for instance, in the aeration tanks of the activated sludge treatment.

In the other step, known as the anaerobic process, the settled sewage solids are digested in open or closed containers and subjected to the action of anaerobic bacteria. Examples of this method are septic tanks, Imhoff tanks, and separate sludge tanks.

Organic trade waste are usually treated by chemical precipitation in combination with sewage solids and, in a few instances, separately by the anaerobic process. With chemical precipitation larger quantities of sludge are formed, causing subsequent difficulties in disposal. With the ordinary anaerobic process, digestion of organic trade wastes is difficult since this process as usually carried out requires large tank capacities, and in combination with sewage solids, often causes great difficulties in the operation of the plant. Furthermore, this process is expensive and time consuming.

This invention has for its salient object to provide a process of decomposing or digesting mixed organic substances, such as sewage, trade wastes, etc., in such a manner that the decomposition will take place in a minimum amount of time and the useful by-products will be materially increased.

Another object of the invention is to provide a process of decomposing organic matter in such a manner that the size of the tank required for digesting the organic matter, such as sewage, will be greatly reduced.

Another object of the invention is to provide a process of digesting or decomposing mixed organic matter, so carried out that the separation of liquids from the solids is facilitated.

Another object of the invention is to provide a process of digesting or decomposing organic matter, so carried out that substantially all pathogenic organisms will be rapidly destroyed as the organic matter is decomposed.

A further object of the invention is the devising of a method of sewage solids digestion wherein the digestion process can be carried out continuously, instead of by batch operation; that is, wherein raw or activated sewage sludge can be periodically, such as daily, added to the digester, and digested sludge can be periodically, such as daily, removed from the digester.

A still further object of the invention is the ability to stimulate and control the functioning of either the liquefying or the gasifying types of bacteria, or both.

Further objects of the invention will appear as the description proceeds.

Briefly described, the invention consists of a process of digesting or decomposing organic matter, such as sewage, trade waste, etc., so carried out that the organic matter is subjected to the action of a group of organisms called thermophilic or "heat loving" bacteria under anaerobic conditions and at temperatures ranging from approximately 50° C. to 70° C.

The invention also consists in the addition of certain organic salts, such as calcium acetate for stimulating or controlling the activity of the gasifying type of bacteria. Further, the invention consists in controlling the body temperature of the bacteria to speed up their activity by increasing the rate of their metabolism.

The subjection of the organic matter to the action of the thermophilic bacteria at the temperatures and under the conditions named results in a much more rapid decomposition of the organic solids than can now be accomplished, a greater production of gas, such as methane, having a high heat value, a much greater and more rapid separation of the liquid from the solids, and in the recovery of by-products, such as acetone, alcohol and organic acids.

Further details of the invention will appear from the following description.

In the anaerobic process of decomposing or digesting organic matter, such as sewage, as practiced at the present time, the organic matter is not brought to a temperature above 24 to 28° C. and at such temperatures the thermophilic bacteria herein shown to be desirable are not active and take no part in the digestive process. Such ordinary digestion requires approximately thirty to thirty-five days under the best possible conditions.

It has been found, however, by long and exhaustive experiments, that when the temperature is raised to temperatures ranging from approximately 50° C. to 70° C. that the bacteria which were active at the lower temperatures are no longer active, but that the thermophilic bacteria are active and accomplish the decomposition or digestion of the organic matter in ten days or less. This reduction in the time required results, in turn, in a very material reduction in the size of the tanks used and it has been found that the same digestion can be accomplished in tanks having approximately one third of the capacity required for the digestion at temperatures lower than those specified.

Furthermore, the digestion accomplished by the thermophilic bacteria at the temperatures and under the conditions described results in the production of greatly increased amounts of combustible gases, principally methane. This gas has a high heat value and can be used for bringing the organic matter to the desired temperature. Also, by the process outlined, the volume of organic matter converted into inoffensive products is considerably larger than with any known digestion processes. Because of this the quantities of ripe sludge to be handled are materially reduced, and moreover, the sludge is more concentrated.

In addition to the advantages above set forth, the separation of liquid from the solids is greatly facilitated. For instance, the increase in liquid separated over the ordinary digestion methods is approximately one hundred percent in a short time, such as twenty-four hours or less. This permits the withdrawal of greater volumes of supernatant liquid which, under ordinary circumstances, require a large tank capacity for storage. Due to the decrease in tank capacity, the amount of heat required is also decreased and the process requires the handling of a smaller volume of digested sludge for further disposal on sand beds, etc., thus materially reducing the cost of operation.

In carrying out the process, the solids or organic matter are heated to temperatures ranging between 45° C. to 70° C. This heating causes the destruction of the major portion of the bacteria which are active at lower temperatures but stimulates the reproduction of and activity of thermophilic bacteria, resulting in a rapid and greatly increased rate of destruction of the organic matter.

The heating of the material to the temperatures mentioned also causes the rapid and complete destruction of substantially all harmful pathogenic organisms under thermophilic conditions. This effect is similar to pasteurization but to a less degree. Due to this destruction, the sludge can be used safely as a fertilizer. However, those organisms which are not pathogenic are not harmed. This method of digestion stimulates what is wanted and kills what is not wanted. This action is not obtained at the temperatures used with the anaerobic digestion heretofore used and the sludge left after such digestion contains disease bearing organisms.

If desired, the initiation of the process is facilitated and the time required may be decreased by the initial addition of mixed or pure cultures of thermophilic bacteria. Such cultures are not necessary after the process has been established but the addition of the cultures at the start eliminates the necessity of adding ripe sludge to the organic matter.

With the usual and known processes of digestion, the raw sewage solids to be decomposed are inoculated with ripe sludge and the amount of such sludge required is very large so that on a dry basis only two percent of raw solids can be added daily. However, with thermophilic digestion, such as that disclosed, the percentage of raw solids added daily can be increased to approximately twelve to fifteen percent, with the result that only one quarter of the digestion capacity is required as compared with the best results obtained by non-thermophilic digestion.

The thermophilic flora are a group containing a variety of organisms of which may be mentioned facultative thermophiles and obligate thermophiles. They grow best at a temperature range of 120° to 140° F. The bacteria which grow most rapidly at lower temperatures either become inactive or are killed. In ordinary sludge digestion, dependence has been placed upon organisms which are most active at temperatures between 60° and 80° F. Those active at higher temperatures do not necessarily produce the same substances during the decomposition processes and do not necessarily grow best at the same reaction. From the results obtained thus far, it seems that the optimum reaction for the group of thermophilic organisms most active in sludge digestion is in the range of pH 7.8 to 8.2. Once the balanced flora is established, this reaction is maintained by the activities of the organisms themselves similar to the lower reaction of the medium produced by organisms which have their optimum at lower temperatures.

Within this thermophilic group are liquefying bacteria which convert the cellulosic material into a liquid which in turn forms the food for a group of gasifying bacteria. If there be insufficient liquefying bacteria to produce enough liquid food for the gasifiers, the functioning of the latter is necessarily inefficient. To overcome any such deficiency, I have found that the activity of the gasifying group present can be controlled by producing food directly available to them which consists of organic salts of the type of calcium acetate. Such food for their direct use to thus render them independent of the liquefying group of bacteria, can be added to the environment in any suitable manner, altho the preferred manner is to add lime to the sludge undergoing digestion, for the lime combines with acetic acid present to form calcium acetate. Therefore, any deficiency in balance between the group can be made up for by this providing of organic salts for the gasifying group.

These bacteria have their body temperature controlled directly by the outside temperature or the temperature of their environment. Thus by increasing the temperature of their environment, their body temperature is increased; their metabolism is increased; they work faster for they must eat faster; and their production of gas is thereby speeded up. Thus, this invention permits of the controlling of the activity of the different types of thermophilic bacteria but also permits of selectively stimulating the activity of the group which produces the final result desired. In case liquefaction should occur, selective stimulation may be brought about by adding small quantities of lime, ammonium carbonate, sodium carbonate, etc. for the prevention of acid decomposition and the stimulation of methane producing organisms.

It has been found that daily charges of 48% fresh solids, on the basis of dry volatile matter originally in the ripe sludge, can be made to the digester. In other words, in tests a quantity of raw material was added every day equal to half the volatile matter content of the original ripe sludge. With such increased daily additions no impairment of the digestion could be observed. On the contrary the gas production increased with increasing daily charges. With 48 per cent daily additions 90 per cent of the total gas produced at the end of the charging period or practically 90 per cent of the gas yield from the daily charge was produced within 24 hours. When the daily charge was omitted one day the gas production decreased decidedly the next day.

Similar daily charges of settled activated sludge were made to ripe thermophilic sludge. The maximum daily charge was 48 per cent on the basis of dry volatile matter. Such daily charges of activated sludge were digested as readily as fresh solids. There is furthermore no indication that these were the maximum percentages that could be handled daily.

The digestion of fresh solids gave a gas yield of 765 c. c. per gram of raw volatile matter added whereas activated sludge produced 405 c. c. of gas. The yield of gas was somewhat higher under thermophilic conditions than at 70 or 82 degrees F. This larger quantity of gas was produced in less than one tenth of the time required at 82 degrees F.

It has been known that activated sluge produces less gas than fresh solids at lower temperatures of digestion. It is of interest that similar relationship holds at the thermophilic range. The composition of the gas at the thermophilic range is nearly the same as in non-thermophilic digestion. The percentage of $CO_2$ is about 25 per cent in the beginning and decreases gradually to about 15 per cent. Methane content on the other hand is 60–65 per cent in the beginning and increases to 75–80 per cent towards the end of digestion. The average percentage of $CO_2$ is 22.5 per cent and of the methane 70 per cent.

The reduction of the volatile matter added is about 70 per cent for fresh solids and 60 per cent for activated sludge. These values are higher than the reduction of volatile matter under ordinary temperatures. The higher percentage reduction of volatile matter in conjunction with higher yield of gas would indicate that the digestion at the thermophilic range is more complete. It has been shown in previous studies that the yield of gas in the non-thermophilic range of 60–80 degrees F. is not affected by a change of temperature; that ultimately the same quantity of gas is obtained at 60 degrees F. as at 80 degrees F. But when change is made of digestion from low temperatures to high temperatures not only is there being changed the speed of the reaction but also the type of process and type of organisms concerned in the decomposition.

With the high daily loadings the question naturally arises whether the sludge is fully digested, but the high volatile matter reduction would indicate the sludge withdrawn is ripe. It has an average ash content of 45–50 per cent whereas the fresh solids added had 20–25 per cent ash and the activated sludge 35 per cent ash. Thus within 1–2 days the raw material with low ash content was converted into ripe sludge with high ash content. The pH value of the sludge drawn was 8.0 again indicating a well digested sludge. The pH value of digested thermophilic sludge is higher than the pH value of ordinary ripe sludge. It has been shown that the reduction of nitrogen content during digestion is higher under thermophilic than it is under non-thermophilic conditions. This would indicate a greater percentage of protein decomposition with greater ammonia accumulation and hence higher pH values. Thus the somewhat higher yields of gas and greater volatile matter reduction might be due to the attack of more resistant proteinaceous materials at the thermophilic range. The reduction of fat is merely the same at low and at high temperatures.

The B. O. D. of the ripe sludge is below 1,500 P. P. M. for each per cent organic matter, which is taken generally to indicate a well digested sludge. The color of the sludge is black and has an inoffensive cooked odor.

The high thermophilic temperatures cause a greater portion of the material to float and as the material is digested it sinks to the bottom. Breaking up of this scum layer and gentle stirring would thus prove beneficial. Shaking in the laboratory was done by rotating the bottles gently once a day. This resulted in a greater rate of gas production. The acceleration of gas production due to shaking was 25–30 per cent. The ultimate amount of gas produced naturally would be the same.

At the higher temperatures the separation of water from solids is greater than at lower temperatures with the result that the sludge becomes denser. This would result in a greater economy of space. However, with a two day digestion schedule the sludge would not have the tendency to compact as would be the case with longer digestion period and thus somewhat offset the advantage of greater separation of liquid. The liquid which separates should be drawn to make room for more raw sludge and when all the liquid is thus drawn then should sludge be drawn.

Thermophilic digestion is not a heat producing process. Heat should be applied from outside. The necessary heat could be supplied from the gas evolved during the decomposition which is not only somewhat higher in quantity than at low temperatures but the volume of gas produced in one day is equal to the volume produced in 25–30 days at lower temperatures. The heat losses are naturally higher in the thermophilic range than at lower temperatures but this acceleration of digestion and gas production with subsequent shorter period of retention in the tank and smaller tank size would more than counterbalance the greater losses of heat. Naturally more careful attention should be paid to proper insulation to reduce the heat losses to a minimum.

The heating of slude to 210 degrees F. by hot water coils placed in the tank may lead to caking on the coils. It would be preferable to preheat the sludge in separate small priming tanks furnished with coils. The temperature to which the sludge should be preheated depends on the heat loss that would ensue on the subsequent two day digestion period in the tank. But with such an arrangement there would be no danger even if it were necessary to heat the solids to the boiling point. The pasteurizing effect of such high temperatures on the bacterial content of the raw material would not bring about inhibitory effect on the digestion since the digestion is not dependent on the organisms in the fresh solids but on the flora established in the ripe sludge. On the other hand even if there were any caking produced in the coils the parts would all be accessible and could readily be cleaned. Some kind of agitation in this priming tank would hasten the heat transfer and result in more efficient heating.

In starting a new thermophilic digestion tank if there is any Imhoff or separate sludge digestion tank sludge available it would be best to seed with such material. The temperature should be brought up to the required point and small daily charges made. The initial daily charges should not exceed 3-4 per cent on the basis of volatile matter until the thermophilic sludge is well established. The establishment of the thermophilic flora should take place in 3-4 weeks. Thereafter the daily charges can be increased gradually until the maximum charge that can safely be taken care of is reached. In larger plants the addition of solids can well be continuous. The solids can be removed continuously from clarifiers with mechanical sludge removers or from hopper bottom sedimentation tanks, circulated through the priming tanks until the desired temperature is obtained, and added to the digester. Such a procedure would help to maintain a more uniform temperature in the digester and more uniform flow of gas than the addition of solids once or twice a day. It would be necessary then to remove liquid or sludge continuously at the same rate as the raw material is added. Liquid should be drawn as much as possible and sludge removed only when all the liquid is withdrawn. The continuous removal of sludge would necessitate some means of continuous disposal of sludge. Ordinary open sludge drying beds could not meet the problem of continuous disposal of sludge adequately. Sludge beds if to be used at all in conjunction with thermophilic digestion should be glass covered. A better means of sludge disposal would be filtration which could be made a continuous operation. Thus within two days after the sewage enters the sewage plant the sludge will be digested and dried ready to be disposed of.

The applications of the invention are very wide. For instance, it may be applied to new or old disposal plants receiving domestic sewage alone or mixtures of sewage and trade waste. The process can be used in connection with old existing plants, somewhat remodeled if necessary, with any combination of tanks, either with fixed roofs, floating roofs or covers, submerged roofs, or tanks without roofs. Furthermore, the invention or process can be applied to the treatment of organic industrial waste, such as packing house or slaughter house wastes.

From the foregoing description it will be clear that the process described is more efficient, accomplishes the desired results in a greatly decreased amount of time, reduces the tank capacity required, and increases the production of useful by-products.

Although one specific embodiment of the invention has been described, it should be understood that the invention is not limited to the particular details mentioned but that the steps in the process may be varied without departing from the invention and no limitations are intended other than those imposed by the appended claims.

Certain portions of this specification will be found in my earlier filed patent application Serial No. 380, 459, filed July 23, 1929.

I claim,

1. The process of decomposing putrescible matter which consists in adding cultures of thermophilic bacteria to the organic matter and subjecting said matter under anaerobic conditions to the action of the thermophilic bacteria at temperatures ranging from approximately 50° C. to 70° C.

2. The process of digesting sewage sludge which consists in subjecting said sludge to the action of the thermophilic group of organisms including liquefying and also gasifying bacteria, and using calcium acetate to stimulate the action of the gasifying bacteria.

HOVHANESS HEUKELEKIAN.